March 25, 1958 — S. A. SCHERBATSKOY — 2,828,423
RADIATION DETECTOR DEVICE
Filed July 22, 1950 — 2 Sheets-Sheet 1

INVENTOR.
Serge A Scherbatskoy
BY

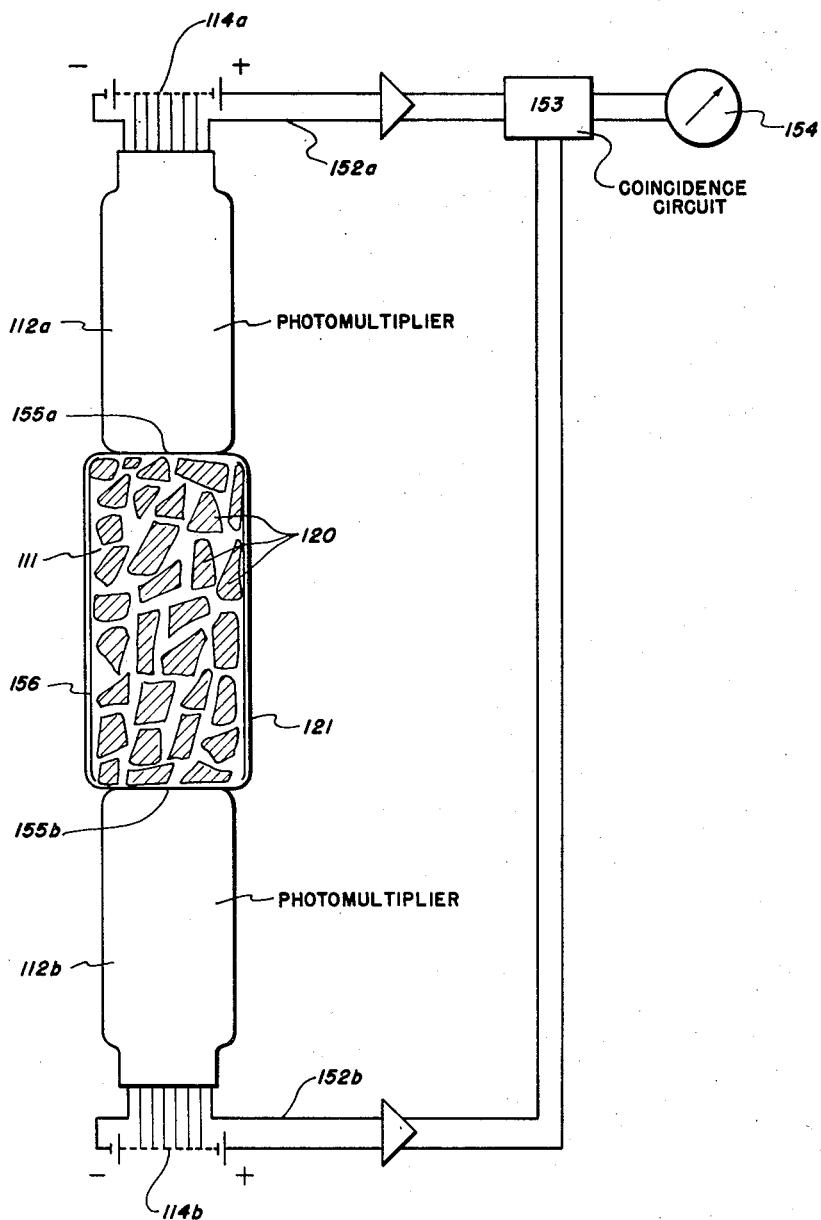

United States Patent Office 2,828,423
Patented Mar. 25, 1958

2,828,423

RADIATION DETECTOR DEVICE

Serge A. Scherbatskoy, Tulsa, Okla., assignor, by mesne assignments, to PGAC Development Co., Houston, Tex., a corporation of Texas Application July 22, 1950, Serial No. 175,386

5 Claims. (Cl. 250—71)

This invention relates to the detecting and measurement of radiation, and more particularly to a scintillation counter for measuring the intensity of such radiation as alpha, beta, gamma rays, or any other radiations resulting from nuclear transmutations or disintegrations.

As is well known, the detecting element of a scintillation counter consists of a suitably chosen crystal such as anthracine, cadmium tungstate, or calcium tungstate commonly designated as "phosphor" that is adapted to scintillate, i. e. to convert the incoming radiation particles such as photons into light impulses. In traversing the crystal the particle to be detected loses its energy in exciting and ionizing the molecules of the crystal. These molecules then radiate energy in the form of fluorescent light, some of which is collected on the photocathode of the multiplier tube.

In order to detect highly penetrating radiations such as gamma and beta rays, the detecting crystal must be relatively thick if high absorption (i. e. good counting efficiency) is desired. This requirement is usually designated as "physical efficiency" of the crystal. We understand therefore that the crystal is physically efficient if a large fraction of the energy lost by the incoming particle is converted into light.

In order that the fluorescent light may reach the photocathode, it is, of course, necessary that the material be relatively transparent to the light emitted. It is therefore required that the radiated photons not be absorbed in the crystal. The fraction of photons that get out is referred to as the "technical efficiency."

Efforts have been made in the past to increase the thickness of a crystal, i. e. its physical efficiency by using finely divided crystalline material such as powdered naphthalene. It has been found, however, that they are quite opaque and thus have a very low technical efficiency.

The attention of many experimenters has turned toward materials which can be obtained in large clear pieces, and some effort has been expended in growing single crystals of various materials for this use. However, considerable difficulty has been encountered in growing large crystals, although very elaborate arrangements have been tried.

It is therefore the object of the present invention to obviate the inconveniences of the prior art and to provide in a scintillation counter a detecting element of a relatively large thickness and physical efficiency, and at the same time of a large transparence, so that the light produced as a result of conversion of the incoming particle will be able to escape from the detecting element.

Further objects and advantages of the present invention will become apparent as the following description proceeds, and the features of novelty that characterize the invention will be pointed out with particularity in the claims annexed to and forming part of this specification.

For further details of a specific device embodying the principles of this invention reference may be had to the accompanying drawings in which:

Fig. 2 shows an improved scintillation counter in which the effects of noise are substantially eliminated.

Figure 1:
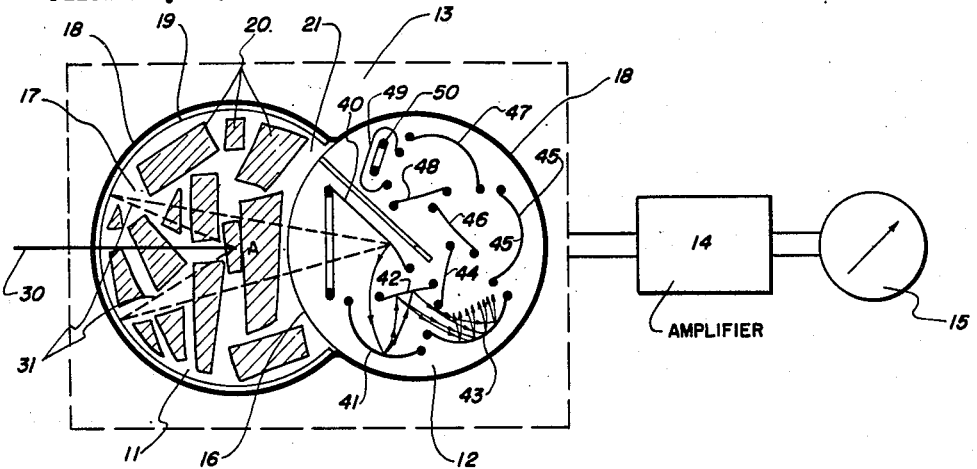
Fig. 1 shows a scintillation counter of high physical and technical efficiency.

Referring now more particularly to Fig. 1, the arrangement shown therein comprises a detector 11 and photomultiplier 12, combined together as a single structure within the block 13. The output of the photomultiplier is connected through the amplifier 14 to an indicator 15.

The photomultiplier is of a standard construction within a cylindrical enclosure having a transparent wall 16. The wall 16 is of a thin optical glass or of a suitable plastic. The detector is contained within an adjacent vessel 17 having its outer wall coated with a light gathering mirror 19. Both the detector and photomultiplier form a unitary structure having its outside walls coated with black paint 18. The vessel 17 comprises a plurality of crystals 20 immersed in a liquid 21. The essential feature of this invention consists in selecting a transparent liquid having substantially the same refractive index as the crystals.

The crystals that are the most suitable are those having the highest possible density and the preferred ones would be cadmium tungstate and calcium tungstate. Cadmium tungstate has a density of 8 and a refractive index of between 2.2 and 2.3 and is reputed to work well at high temperatures and under gamma excitation emits light that peaks in the green at 5000 A. Calcium tungstate has a specific gravity of about 5.9 to 6.1 and a refractive index of 1.93 and emits light that, according to my understanding, is similar. The preferred liquid would be a mixture of 1 part by weight methylene iodide, 8 parts by weight yellow phosphorous, and 1 part by weight sulphur. This liquid has a refractive index of 2.06 and can be varied somewhat from this figure, especially in the downward direction so as to cover the range of refractive indices of 1.70 to 2.06.

Let numeral 30 designate the track of incoming particles such as gamma ray photons. The particle penetrates into the vessel 17 containing the crystals 20 immersed in the liquids 21 and interacts in the point A with one of the crystals. As is well known, a Compton electron is ejected at the point A as a result of such interaction, said electron losing its energy by exciting and ionizing the molecules in said crystal in the immediate neighborhood of the point A. These molecules radiate energy in the form of light in all directions. Because the refractive index of the crystals is the same as the refractive index of the surrounding liquid, no reflection of light occurs on the boundary between the crystals and the liquid. Consequently, each ray of light emerging from the point A travels rectilinearly as if the contents of the vessel 17 were optically homogeneous. Two such rays of light are designated on the figure by dotted lines 31. These rays of light become reflected by the mirror 19, then transmitted through the transparent wall 16 to the photomultiplier 12.

It is thus apparent that the detecting element 11 has a very high physical efficiency since the ability of converting the incoming particles into light increases with the size and the number of the crystals. For all practical purposes the size of the crystal is here the sum of sizes of all the crystal fragments immersed in the liquid. Furthermore, the technical efficiency of the detector is very high since the space comprising the crystal fragments and the surrounding liquid is both transparent and optically homogeneous. This is accomplished by choosing the liquid of the same optical characteristics as the crystals. Consequently, the photons of light that are created travel outwards rectilinearly without suffering any reflections on the boundaries between the crystal fragments and the liquid and are subsequently by means of the mirror 19 directed to the photomultiplier 12.

Since the incident gamma rays have large energies in comparison with photons of light, and since the energy efficiency of the crystal fragments in converting these radiations into light is high, each quantum of absorbed radiation results in a vary large number of photons of light. These photons of light reflected by the mirror 19 enter into the photomultiplier and impinge upon the photocathode 40, thus forming a single pulse of photoelectrons. This pulse is then amplified by the familiar secondary emission system of the multiplier tube comprising the photocathode 40 and a series of dynodes 41–50, each at a higher potential than the preceding one. Each photoelectron is swept to the first dynode by a potential difference of about a hundred volts and ejects four or five secondary electrons. These in turn are swept to the second dynode and similarly multiplied by the secondary emission amplification. After nine such stages, an avalanche of a million electrons, more or less, appears at the output of the photomultiplier tubes as a result of each initial photoelectron. We obtain then a relatively strong output signal which becomes amplified in the amplifier 14 and subsequently transmitted to the indicator 15.

In evaluating the performance of a photomultiplier such as shown in Fig. 1, one should take into account signal to noise ratio and decrease insofar as possible the amount of noise that originates in the photomultiplier. The noise includes the dark current and statistical fluctuation in gain for elemental processes. The dark current noise appears as pulses which tend to overlap the signal pulses in amplitude, determining in this way the low intensity limit of sensitivity of the detector. The electrode surfaces, having a low work function, tend also to release electrons whenever they acquire the higher thermal velocities associated with molecular agitation even at room temperatures. Thus a dark current of 10,000 to 100,000 thermal emission electrons per second is emitted from photocathode and each dynode. Only those emitted from the photocathode receive the full amplification and are of primary importance in contributing to noise. These parasitic pulses intermingle with any radiation signal and tend to obscure them.

Fig. 2 shows an arrangement for eliminating noise from the indication of a scintillation counter. Referring now more particularly to Fig. 2, the arrangement shown therein comprises a detector 111, and two photomultipliers 112a, 112b adjacent thereto combined together as a single structure. The photomultipliers are of conventional type such as RCA5819 and comprise dynodes which are connected in conventional manner to the batteries 114a, 114b. The output terminals 152a of photomultiplier 112a and the output terminals 152b of photomultiplier 112b are connected to a coincidence circuit 153 which in turn has its output connected to an indicator 154.

The walls of the detector designated as 155a, 155b that are adjacent to the photomultipliers 112a, 112b consist of a thin optical glass or transparent plastic. The side walls 156 are coated inside with silver to provide reflection of light. The detector comprises a plurality of crystals 120 submerged in liquid 121, said liquid and said crystals having substantially the same index of refraction. If a radiation particle interacts with one of the crystals 120, a group of photons emerges in all directions at said point of interaction. A portion of said photons enters through the transparent walls 155a and interacts with the photocathode of the photomultiplier 112a, causing an emission of electrons and consequently a short electrical pulse across the terminals 152a. Another portion of said photons enters through the transparent wall 155b and interacts with the photocathode of the photomultiplier 112b causing a short electrical pulse across the terminals 152b.

It is thus apparent that at any instant at which an incoming radiation particle interacts with one of the crystals 120 we obtain two electrical impulses across the terminals 152a, 152b, said impulses occurring simultaneously. The block 153 represents any standard coincidence circuit that responds to the simultaneous occurrence of impulses across the terminals 152a, 153b and transmits to the indicator 154 a single impulse. Consequently, whenever a radiation particle strikes one of the crystals 120, an impulse is shown on the indicator 154.

As stated above, the photocathode surfaces of the photomultiplier 112a and 112b usually release electrons because of the relatively high thermal agitation that often overcomes the relatively low work function of said surface. As a result of such an effect, we obtain electrical pulses that spontaneously and randomly appear across the terminals 152a and 152b of the photomultipliers. These random pulses are designated as "dark current" and represent the noise effect that tends to make any useful signal that is created as a result of an incoming radiation particle. It is, however, apparent that the noise impulses across the terminals 152a, 153b occur at random and are not coincident one with respect to the other. Therefore, the coincidence circuit does not respond to them and they are not capable of influencing the indication of the meter 154. Thus the coincidence circuit 153 responds only to the useful signals and eliminates the noise effects.

Figure 3A:
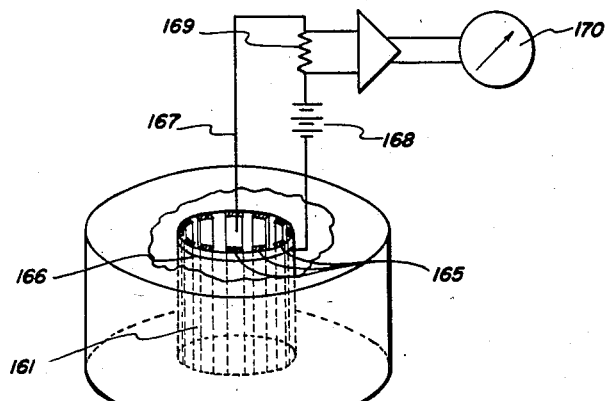
Figs. 3a and 3b show another embodiment of a scintillation counter comprising a photon counter.
Figure 3B:
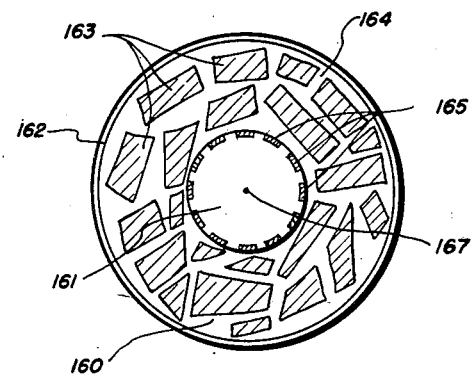

It is apparent that the essential purpose of the crystal assembly in a scintillation counter is to translate the incoming radiation particles into photons of light. In Figs. 3a and 3b I provide an instrument comprising a counter for translating the light photons into electrical impulses. Fig. 3a shows the instrument in perspective and Fig. 3b shows its horizontal cross section. As shown in these figures numeral 160 represents an outer vessel of cylindrical shape within which is located a counter 161. The cylindrical wall of the vessel is coated inside with a light gathering mirror 162 and outside with black paint. The portion of the space within the vessel 160, but outside the counter 161, comprises crystals 163 of calcium tungstate immersed in a liquid 164 having the same refractive index as the crystals. The liquid may consist of the same mixture as specified above. The counter 161 has a cylindrical transparent wall of a thin optical glass or transparent plastic. The inside surface of the wall is covered with strips of photosurfaces suitably displaced one from another and electrically interconnected by means of a conductive ring 166.

Along the axis of the cylinder is stretched a wire 167 and a suitable voltage derived from the battery 168 in series with the resistor 169 is applied between the wire 167 acting as anode and the photosensitive segments 165 acting as cathode.

It is apparent that whenever a radiation particle interacts with one of the crystals 163 a group of photons emerge in all directions at said point of interaction. A portion of said photons enters through the transparent portions of the counter wall and fall on one of the photosensitive segments 165. As a result of photoelectric interaction, an electron is ejected from the segment 165 and causes a counter discharge in a manner well known in the art. We obtain thus a current impulse delivered from the battery 168 through the resistor 169. Such a current impulse occurs in coincidence with the arrival of a radiation particle, and is used to actuate a suitable indicator 170.

I claim:

1. A scintillation counter for measuring radiation comprising a container, a transparent fluid within said container, and a plurality of crystals submerged in said fluid, said crystals being substantially transparent to light impulses developed therewithin and being adapted to interact with incoming radiation particles and to produce a plurality of photons of light that emerge substantially simultaneously as a result of said interaction, the refractive index of said fluid being the same as the refractive index of said crystals, an ionization chamber comprising a suitable gas and a photosensitive element, whereby an electron ejected from said photosensitive element as a result of interaction of one of said light photons ionizes said gas, and means for indicating the amount of ionization thus produced.

2. A scintillation counter for measuring radiation comprising a container, a cathode member positioned within said container and having a plurality of photosensitive areas on the inner surface thereof separated by areas substantially transparent to light, a substance positioned between said cathode member and the inner wall of said container and adapted to interact with incoming radiation and produce photons of light as a result of said interactions, whereby photons of light produced in said substance pass through said transparent areas of said cathode member and eject electrons from said photosensitive areas thereof, means including an anode member positioned centrally of said cathode member for developing electrical impulses in response to said ejected electrons, and means for counting the rate of occurrence of said electrical impulses.

3. A device for measuring radiation comprising a container, a counter of the pulse producing type positioned within said container, said counter having a cathode member provided with photosensitive areas on the inner surface thereof and having transparent areas interspaced with said photosensitive areas, a substance positioned between said cathode member and the inner wall of said container and adapted to interact with incoming radiation and produce photons of light as a result of said interactions, said light photons being admitted to said counter through said transparent areas and ejecting electrons from said photo-sensitive surfaces, said counter translating said ejected electrons into corresponding electrical impulses, and means for counting the rate of occurrence of said electrical impulses.

4. A scintillation counter as claimed in claim 2, wherein said substance comprises a plurality of crystals adapted to translate incoming radiation into light impulses, and a homogeneous material surrounding said crystals, said material being substantially transparent to light impulses developed within said crystals and having a refractive index substantially equal to the refractive index of said crystals.

5. A device for measuring radiation as claimed in claim 3, wherein said substance comprises a plurality of crystals adapted to translate incoming radiation into light impulses, and a homogeneous material surrounding said crystals, said material being substantially transparent to light impulses developed within said crystals and having a refractive index substantially equal to the refractive index of said crystals.

References Cited in the file of this patent

UNITED STATES PATENTS

| 2,517,404 | Morton | Aug. 1, 1950 |
| 2,534,932 | Sun | Dec. 19, 1950 |
| 2,559,219 | Ludeman | July 3, 1951 |
| 2,573,200 | Hushley | Oct. 30, 1951 |
| 2,666,145 | Eversole et al. | Jan. 12, 1954 |
| 2,686,266 | Pringle et al. | Aug. 10, 1954 |

OTHER REFERENCES

"Luminescence of Liquids and Solids," Pringsheim et al., publ. by Interscience Publishers, Inc., New York, N. Y., 1943, pp. 54–58.

"The ABC of Luminescence," pub. by the New Jersey Zinc Co., New York, N. Y., 1944, page 20.

AECD–2447, December 15, 1948, pp. 1–3.

AECD–1889, April 20, 1948, pp. 1–6.

AECD–2203, June 30, 1948, pp. 1–10.